United States Patent
Yanagida et al.

(10) Patent No.: US 11,766,924 B2
(45) Date of Patent: Sep. 26, 2023

(54) POWER SUPPLY APPARATUS AND VEHICLE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Taiji Yanagida, Mie (JP); Hiroki Hirai, Mie (JP); Ryoya Okamoto, Mie (JP); Koji Yamaguchi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 344 days.

(21) Appl. No.: 17/311,441

(22) PCT Filed: Dec. 9, 2019

(86) PCT No.: PCT/JP2019/048004
§ 371 (c)(1),
(2) Date: Jun. 7, 2021

(87) PCT Pub. No.: WO2020/137471
PCT Pub. Date: Jul. 2, 2020

(65) Prior Publication Data
US 2022/0024293 A1   Jan. 27, 2022

(30) Foreign Application Priority Data

Dec. 26, 2018 (JP) .................................. 2018-242446

(51) Int. Cl.
*B60K 1/00* (2006.01)
*B60R 16/02* (2006.01)
(Continued)

(52) U.S. Cl.
CPC .................. *B60K 1/00* (2013.01); *B60K 1/04* (2013.01); *B60L 50/66* (2019.02);
(Continued)

(58) Field of Classification Search
CPC .... B60K 1/00; B60K 2001/0438; B60K 1/04; B60L 50/56; B60L 2210/10;
(Continued)

(56) References Cited

U.S. PATENT DOCUMENTS

2006/0102398 A1   5/2006   Mizuno
2007/0007060 A1   1/2007   Ono et al.
2014/0017546 A1   1/2014   Yanagi

FOREIGN PATENT DOCUMENTS

JP   09-309343   12/1997
JP   2004-127747   4/2004
(Continued)

OTHER PUBLICATIONS

Official Communication issued in International Bureau of WIPO Patent Application No. PCT/JP2019/048004, dated Feb. 25, 2020, along with an English translation thereof.

*Primary Examiner* — Robert L Deberadinis
(74) *Attorney, Agent, or Firm* — Greenblum & Bernstein, P.L.C.

(57) ABSTRACT

Provided is a power supply apparatus that can be disposed below a floor panel of a vehicle, including: a wiring structural body that is disposed below the floor panel, and is routed such that a first high-voltage wire harness, a second high-voltage wire harness, and a low-voltage wire harness extend along the wiring structural body; a high-voltage
(Continued)

electricity storage device disposed below the wiring structural body; a first low-voltage electricity storage device and a second low-voltage electricity storage device that are disposed below the wiring structural body; and a 100-V charger, a first DC/DC converter, and a second DC/DC converter that are disposed below the wiring structural body.

7 Claims, 11 Drawing Sheets

(51) Int. Cl.
  *B60L 50/60* (2019.01)
  *B60K 1/04* (2019.01)
  *H02M 3/00* (2006.01)

(52) U.S. Cl.
  CPC .. *B60R 16/0207* (2013.01); *B60K 2001/0438* (2013.01); *B60L 2210/10* (2013.01); *H02M 3/003* (2021.05)

(58) Field of Classification Search
  CPC .... B60R 16/0207; B60K 16/02; H02M 3/003; H02M 3/00
  See application file for complete search history.

(56) References Cited

FOREIGN PATENT DOCUMENTS

| | | |
|---|---|---|
| JP | 2007-015614 | 1/2007 |
| JP | 2014-022092 | 2/2014 |
| JP | 2015-107727 | 6/2015 |
| JP | 2015-182655 | 10/2015 |
| JP | 2016-159772 | 9/2016 |

POWER SUPPLY APPARATUS AND VEHICLE

TECHNICAL FIELD

The technique disclosed in the present specification relates to a power supply apparatus that can be mounted in a vehicle.

BACKGROUND ART

Conventionally, in a hybrid automobile including an internal combustion engine and an electric motor, a high-voltage power supply used as a driving source for driving the electric motor is disposed under the floor of the vehicle or inside the trunk, and a low-voltage power supply for supplying power to in-vehicle electric devices is disposed inside an engine room (see Patent Document 1).

CITATION LIST

Patent Documents

Patent Document 1: JP 2016-159772A

SUMMARY OF INVENTION

Technical Problem

According to the above-described technique, a wire harness is routed over a long length from under the floor of the vehicle or from the trunk to the engine room in order to electrically connect the low-voltage power supply and the high-voltage power supply to each other. Furthermore, when power is supplied from the low-voltage power supply to an electric device mounted at the rear of the vehicle, the wire harness is routed again from the low-voltage power supply to the rear of the vehicle under the floor of the vehicle. For this reason, there has been a need to simplify the wiring structure.

The technique disclosed in the present specification has been completed based on the above-described circumstances, and an object thereof is to make the overall wiring structure of a power supply apparatus compact.

Solution to Problem

The technique disclosed in the present specification is directed to a power supply apparatus that can be disposed below a floor panel of a vehicle, including: a wiring structural body that is disposed below the floor panel, and is routed such that a plurality of wire harnesses extend along the wiring structural body; at least one high-voltage electricity storage device that is disposed below the wiring structural body, and is connected to the plurality of wire harnesses; at least one low-voltage electricity storage device that is disposed below the wiring structural body, is connected to the plurality of wire harnesses, and outputs a voltage smaller than a voltage output by the high-voltage electricity storage device; and an electric device that is disposed below the wiring structural body, and is connected to at least one of the high-voltage electricity storage device and the low-voltage electricity storage device via the plurality of wire harnesses.

With the above-described configuration, the high-voltage electricity storage device, the low-voltage electricity storage device, and the electric device can be collectively disposed below the floor panel of the vehicle in a compact manner. Accordingly, it is possible to reduce the length of the wire harness for connecting at least one of the high-voltage electricity storage device and the low-voltage electricity storage device to the electric device, and route the plurality of wire harnesses so as to extend along the wiring structural body, thus making the overall wiring structure of the power supply apparatus compact.

The following embodiments are preferable as embodiments of the technique disclosed in the present specification.

The electric device is a DC/DC converter.

With the above-described configuration, the voltage of at least one of the high-voltage electricity storage device and the low-voltage electricity storage device can be stably output.

At least one of the high-voltage electricity storage device and the low-voltage electricity storage device is connected to the wiring structural body via a connector.

With the above-described configuration, at least one of the high-voltage electricity storage device and the low-voltage electricity storage device can be removably disposed on the wiring structural body via the connector. Accordingly, it is possible to easily replace at least one of the high-voltage electricity storage device and the low-voltage electricity storage device.

The low-voltage electricity storage device is disposed forward of the wiring structural body.

With the above-described configuration, the low-voltage electricity storage device can be disposed forward of the floor panel of the vehicle. Since the instrument panel is disposed forward of the floor panel, it is possible to reduce the length of the wire harness for connecting the low-voltage electricity storage device and the instrument panel to each other when the power output from the low-voltage electricity storage device is to be supplied to the instrument panel.

At least one auxiliary wire harness different from the plurality of wire harnesses is routed along the wiring structural body, and is drawn forward and rearward of the wiring structural body.

With the above-described configuration, the auxiliary wire harness can be routed so as to extend along the wiring structural body, and the wire harness can be routed from the front to the rear of the vehicle by being drawn rearward and forward of the wiring structural body. Accordingly, there is no need to separately provide a structure for routing the auxiliary wire harness, therefore the overall routing structure for the auxiliary wire harness can be made compact.

The wiring structural body is made of a conductive metal, and the plurality of wire harnesses are routed below the wiring structural body.

With the above-described configuration, it is possible to keep a foreign object from colliding, from above, with the plurality of wire harnesses. Furthermore, it is possible to electromagnetically shield the plurality of wire harnesses.

A vehicle including: the above-described power supply apparatus; and a vehicle body including a floor panel located above the power supply apparatus, wherein the power supply apparatus is disposed in the vicinity of an intermediate position of the vehicle in a front-rear direction thereof.

The above-described configuration can be easily applied to any of the cases where the vehicle includes only a front motor, where the vehicle includes only a rear motor, and where the vehicle includes both a front motor and a rear motor.

Advantageous Effects of Invention

According to the technique disclosed in the present specification, it is possible to make the overall wiring structure of a power supply apparatus compact.

DESCRIPTION OF EMBODIMENTS

Embodiment 1

Embodiment 1, in which the technique disclosed in the present specification is applied to a power supply apparatus 11 that can be attached to a vehicle 10 such as an automobile, will be described with reference to FIGS. 1 to 11. The following description will be given assuming that the Z direction is the upward direction, the Y direction is the forward direction, and the X direction is the leftward direction. For a plurality of identical members, reference numerals may be assigned to some of the members, and reference numerals may be omitted for the other members.

Vehicle 10

Figure 1:
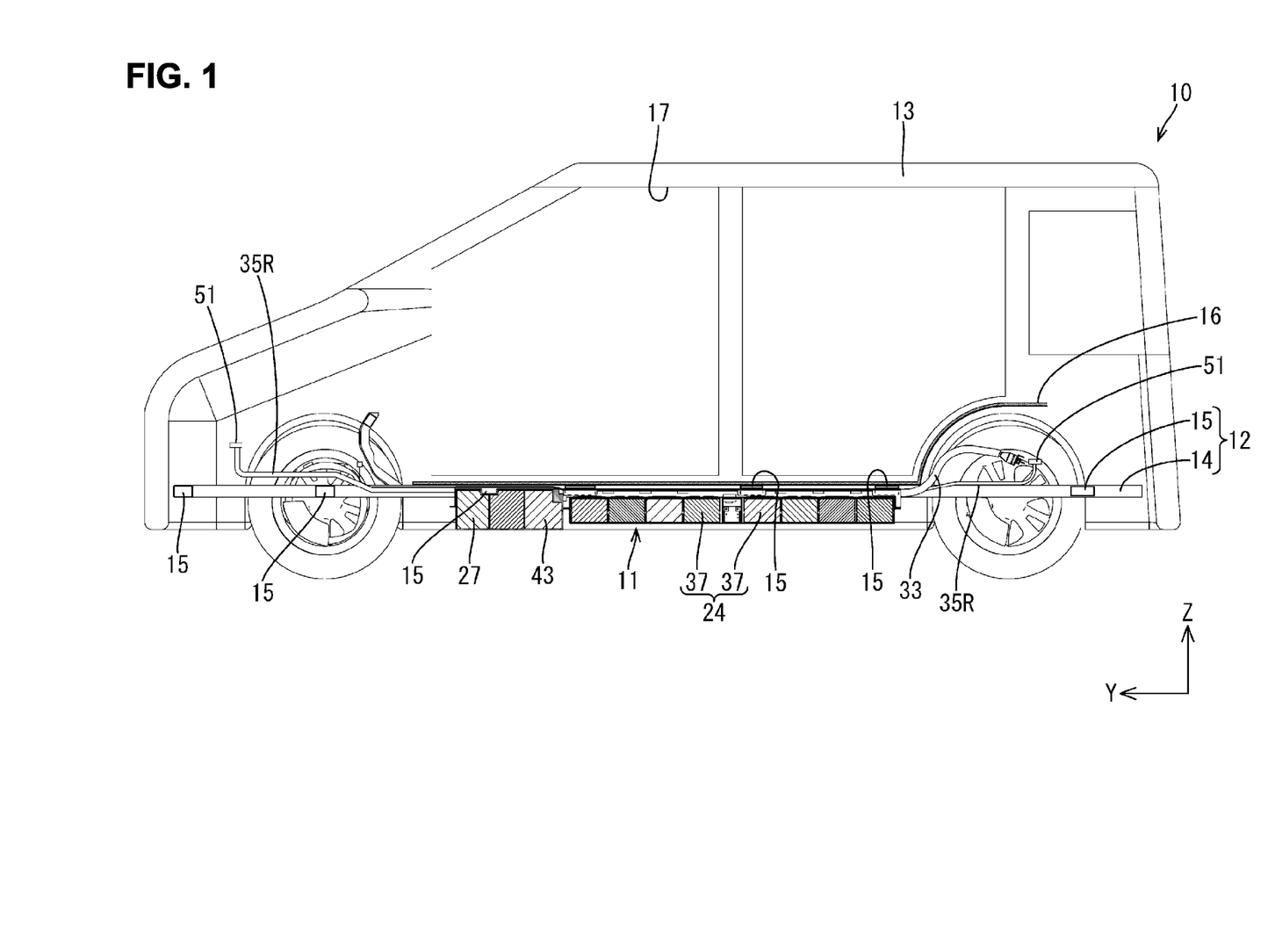
FIG. 1 is a cross-sectional side view showing a vehicle and a power supply apparatus according to Embodiment 1.

As shown in FIG. 1, the vehicle 10 includes a frame 12 made of metal, and a vehicle body 13 attached to the frame 12. The frame 12 includes a pair of side frames 14 extending in the front-rear direction and lined up spaced apart in the left-right direction, and a plurality of (six in the present embodiment) cross frames 15 that couple the two side frames 14 to each other in the left-right direction. The two side frames 14 are disposed substantially parallel. A region of the pair of side frames 14 that constitutes approximately one-quarter extending rearward from a front end portion thereof is formed to be slightly narrower in the left-right direction.

The side frames 14 and the cross frames 15 each have a rectangular tube shape with a substantially rectangular cross section. The side frames 14 and the cross frame 15 are welded to each other by a known method.

A plate-shaped floor panel 16 is disposed above the frame 12. A vehicle compartment 17 in which a vehicle occupant rides is formed above the floor panel 16. An instrument panel 18 is disposed at a position that is located inside the vehicle compartment 17 and toward a front end portion of the floor panel 16 (see FIG. 2). Electric/electronic components such as a speedometer, a car navigation system, and an operation panel for an air conditioner are disposed in the instrument panel 18. In addition, a 12-V socket 19 and a 100-V socket 20 are disposed in the instrument panel 18. DC power with a voltage of 12 V is supplied from the 12-V socket 19, and AC power with a voltage of 100 V is supplied from the 100-V socket 20. Note that the positions of the 12-V socket 19 and the 100-V socket 20 are not limited to positions of the instrument panel 18, and the 12-V socket 19 and the 100-V socket 20 can be disposed at any position of the vehicle compartment 17.

A rear end portion of the floor panel 16 extends rearward while being bent upward in an arc shape as viewed from the side. This prevents the floor panel 16 from interfering with rear wheels and the axles of the rear wheels.

A front motor 21 is disposed at a position toward a front end portion of the vehicle 10. A rear motor 22 is disposed at a position toward a rear end portion of the vehicle 10.

Power Supply Device 11

Figure 3:
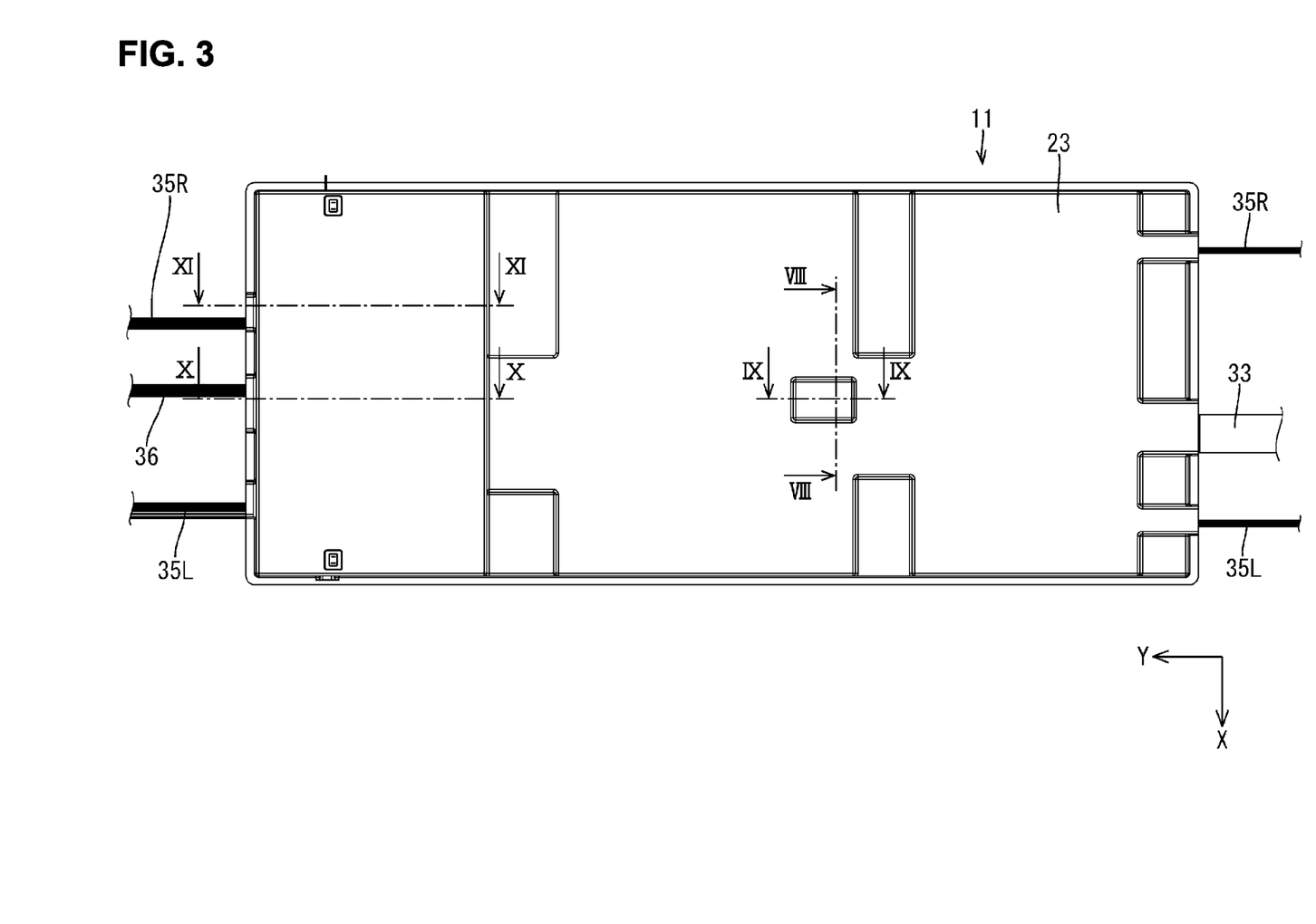
FIG. 3 is a plan view showing the power supply apparatus.
Figure 4:
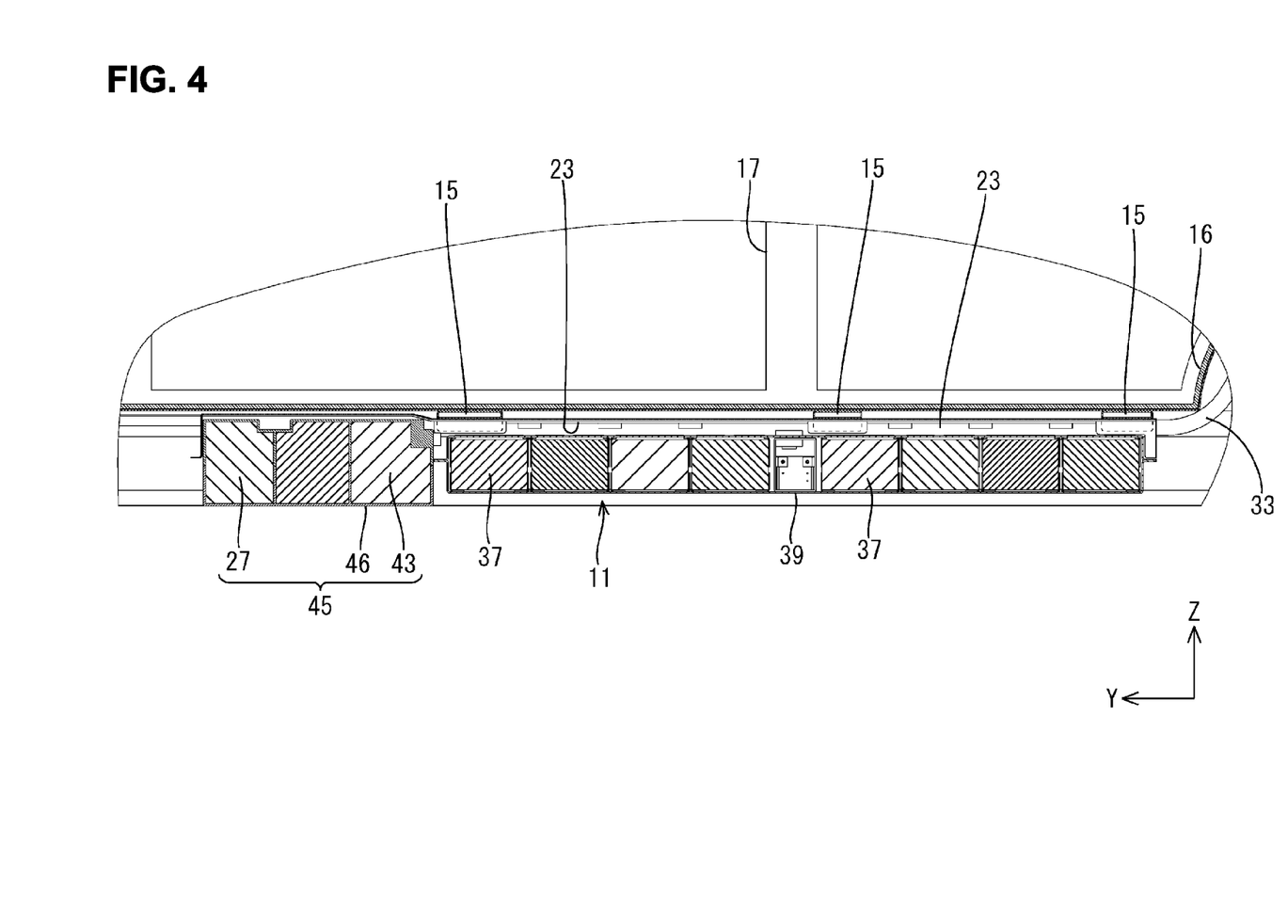
FIG. 4 is a partially cutout cross-sectional side view showing a floor panel and the power supply apparatus.
Figure 5:
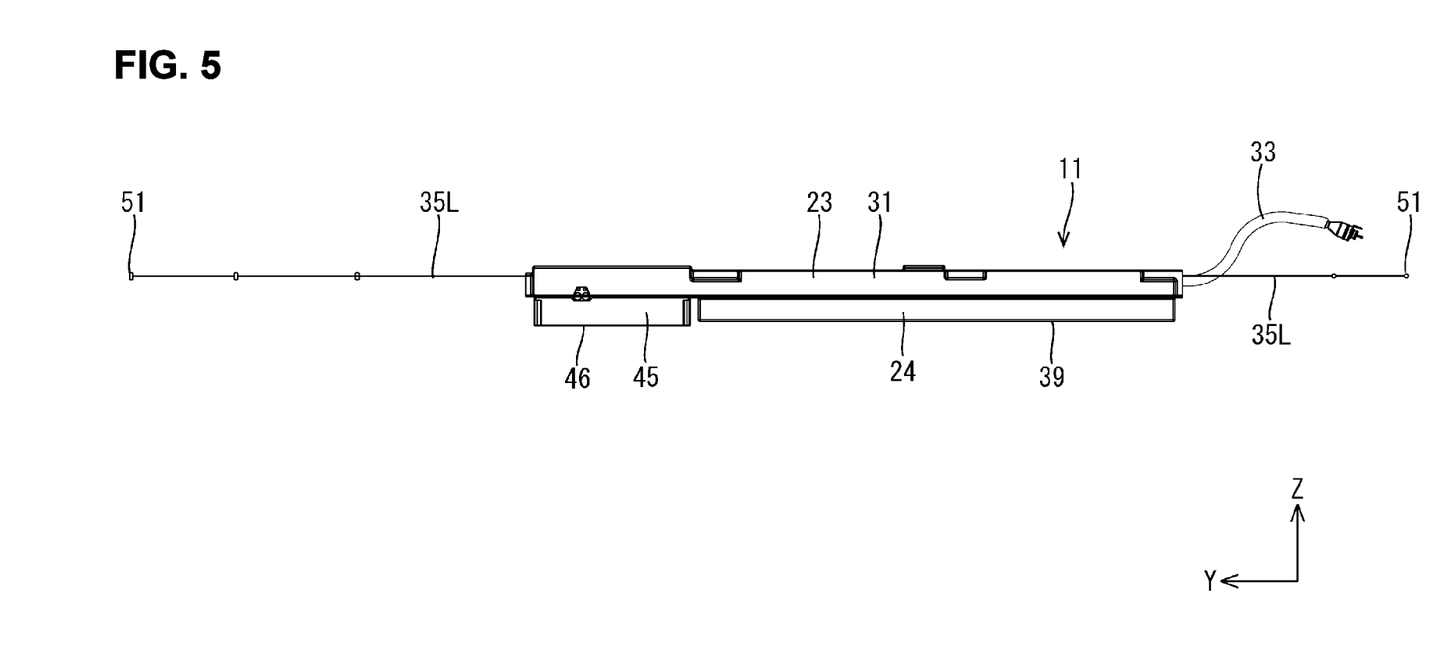
FIG. 5 is a side view showing the power supply apparatus.

As shown in FIG. 3, a power supply apparatus 11 is disposed below the floor panel 16. As shown in FIGS. 4 and 5, the power supply apparatus 11 includes a wiring structural body 23 having a flat shape in the up-down direction and extending in the front-rear direction. Disposed below the wiring structural body 23 are a high-voltage electricity storage device 24, a first low-voltage electricity storage device 25 (an example of a low-voltage electricity storage device), a second low-voltage electricity storage device 26 (an example of the low-voltage electricity storage device), a 100-V charger 27 (an example of an electric device), a first DC/DC converter 28 (an example of the electric device), and a second DC/DC converter 29 (an example of the electric device).

The power supply apparatus 11 has a substantially rectangular shape as viewed from above. A front end portion of the power supply apparatus 11 is located slightly rearward of the front end portion of the floor panel 16. A rear end portion of the power supply apparatus 11 is located slightly forward of the upwardly bent portion of the floor panel 16. As a whole, the power supply apparatus 11 is disposed below the flat portion of the floor panel 16.

Figure 2:
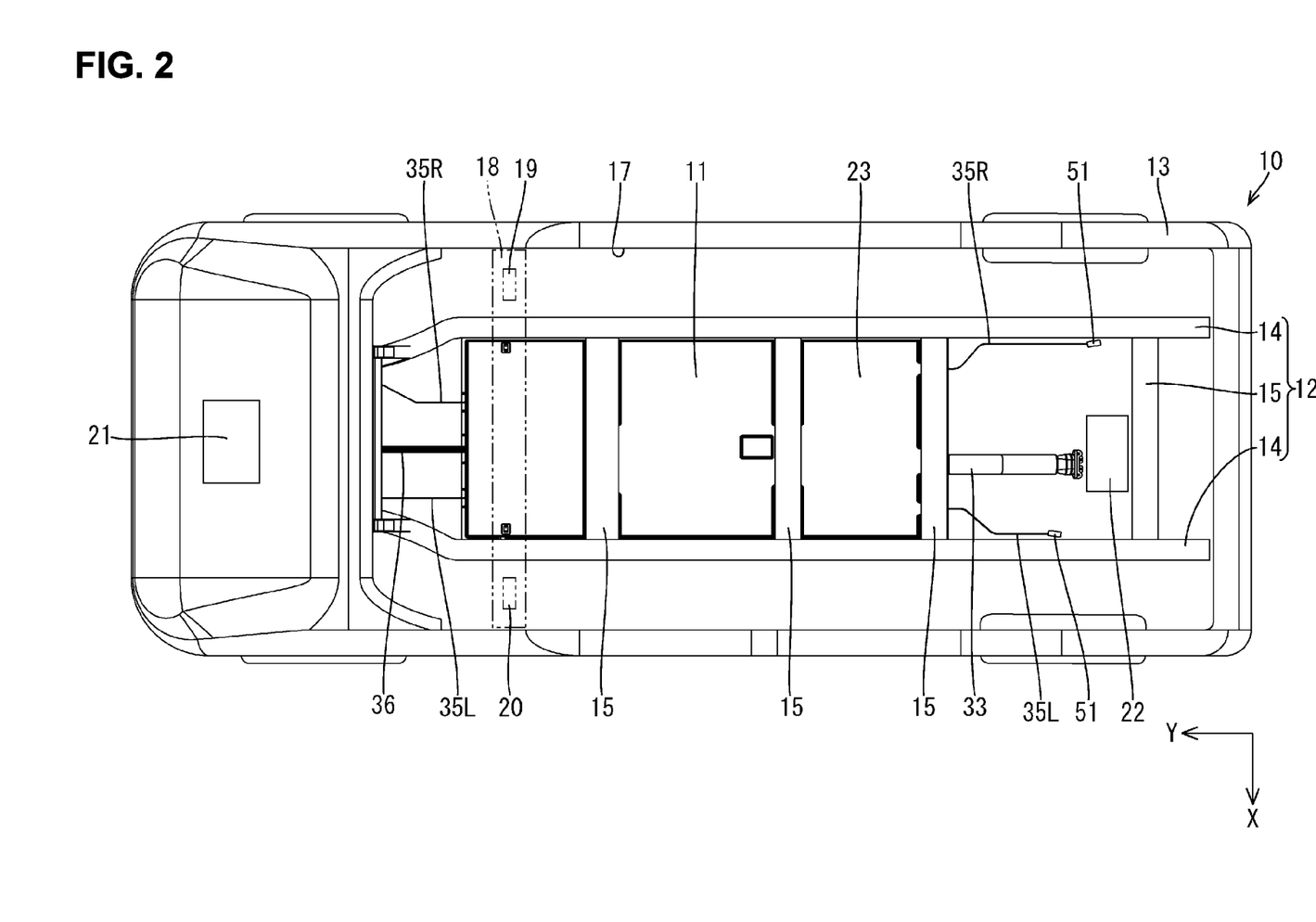
FIG. 2 is a cross-sectional plan view showing the vehicle and the power supply apparatus.

As shown in FIG. 2, the power supply apparatus 11 is disposed at a position that is located rearward of the region of the pair of side frames 14 that is formed to be narrower in the left-right direction, and forward of the second rearmost cross frame 15.

As shown in FIG. 2, the power supply apparatus 11 is disposed in a region on the inside side of the pair of side frames 14 in the left-right direction. The width in the left-right direction of the power supply apparatus 11 is set to be the same, or slightly smaller than, the interval between the two side frames 14.

Wiring Structural Body 23

As shown in FIG. 4, below the floor panel 16, the wiring structural body 23 is disposed so as to extend along a lower surface of the floor panel 16. The wiring structural body 23 has a substantially rectangular shape as viewed from above. The wiring structural body 23 includes a top plate 30, and side walls 31 extending downward from side edges of the top plate 30. The wiring structural body 23 as a whole has a generally flat shape in the up-down direction, and also has a box shape that is open downward. The wiring structural body 23 according to the present embodiment is made of a metal such as copper, a copper alloy, aluminum, an aluminum alloy, or stainless steel.

Disposed below the top plate 30 of the wiring structural body 23 are a first high-voltage wire harness 32 (an example of a wire harness) and a second high-voltage wire harness 33 (an example of the wire harness) that extend in the front-rear direction (see FIG. 6). A low-voltage wire harness 34 (an example of the wire harness) extending substantially in the left-right direction is disposed on a lower surface of the top plate 30 of the wiring structural body 23 at a position toward the front end portion thereof. On the lower surface of the wiring structural body 23, a right auxiliary wire harness 35R (an example of an auxiliary wire harness) and a left auxiliary wire harness 35L (an example of the auxiliary wire harness) that extend in the front-rear direction and are drawn forward and rearward are lined up spaced apart in the left-right direction. At a front edge of the wiring structural body 23, a power-feeding wire harness 36 is drawn forward from the vicinity of the center in the left-right direction. A front end of the power-feeding wire harness 36 is connected to a power-feeding connector, which is not shown. The high-voltage electricity storage device 24 is configured to be charged as a result of power being supplied from the outside via the power-feeding connector.

The right auxiliary wire harness 35R is disposed on the right side of the wiring structural body 23, and the left auxiliary wire harness 35L is disposed on the left side of the wiring structural body 23. A sensor 51 is connected to a front end portion and a rear end portion of each of the right auxiliary wire harness 35R and the left auxiliary wire harness 35L. The right auxiliary wire harness 35R and the left auxiliary wire harness 35L are configured to be redundant: even if one of the right auxiliary wire harness 35R and the left auxiliary wire harness 35L is broken, the sensor 51 connected to that auxiliary wire harness is supplemented by the sensor 51 connected to the other.

High-Voltage Electricity Storage Device 24

Below the wiring structural body 23, a high-voltage electricity storage device 24 including a plurality of electricity storage elements 37 is disposed in a region of the wiring structural body 23 that constitutes approximately three-quarter extending forward from a rear end portion thereof in the front-rear direction. The high-voltage electricity storage device 24 is configured to output DC power with a voltage higher than 100 V as a result of at least some of the plurality of electricity storage elements 37 being connected in series. Some of the plurality of electricity storage elements 37 may be connected in parallel.

The high-voltage electricity storage device 24 is configured such that a plurality of electricity storage element rows 38, each of which includes the plurality of electricity storage elements 37 lined up in the left-right direction, are accommodated in a metal casing 39 so as to be lined up in the front-rear direction.

Figure 8:
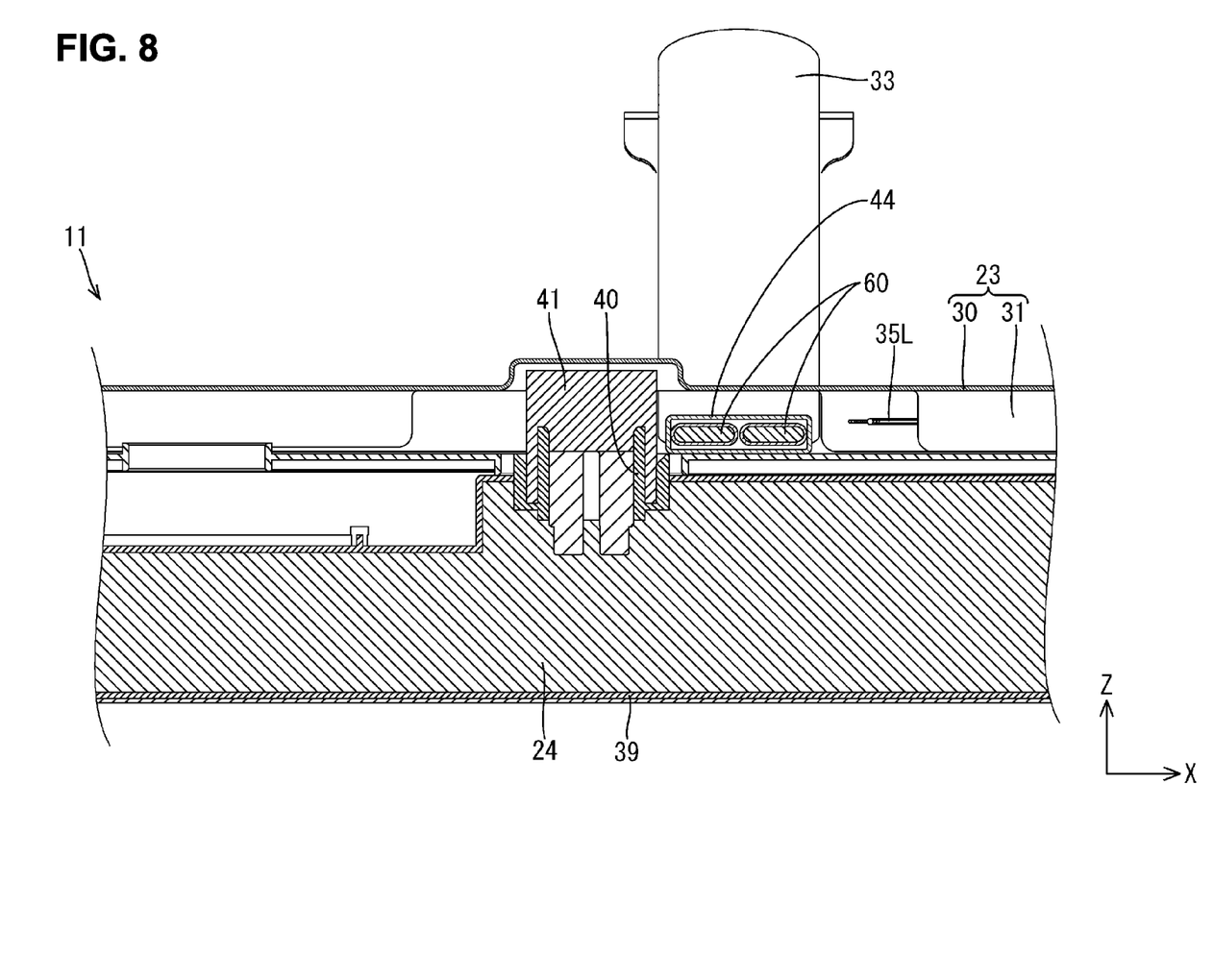
FIG. 8 is a cross-sectional view taken along the line VIII-VIII in FIG. 3.
Figure 9:
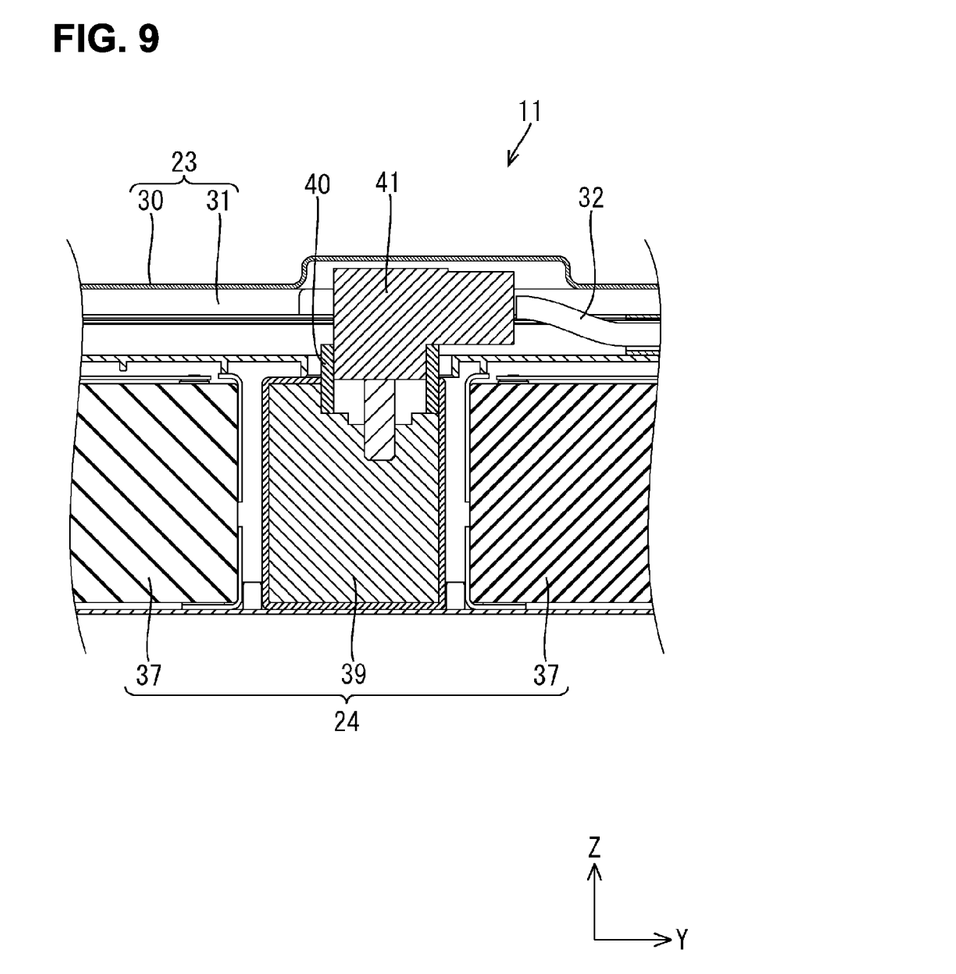
FIG. 9 is a cross-sectional view taken along the line IX-IX in FIG. 3.
Figure 10:
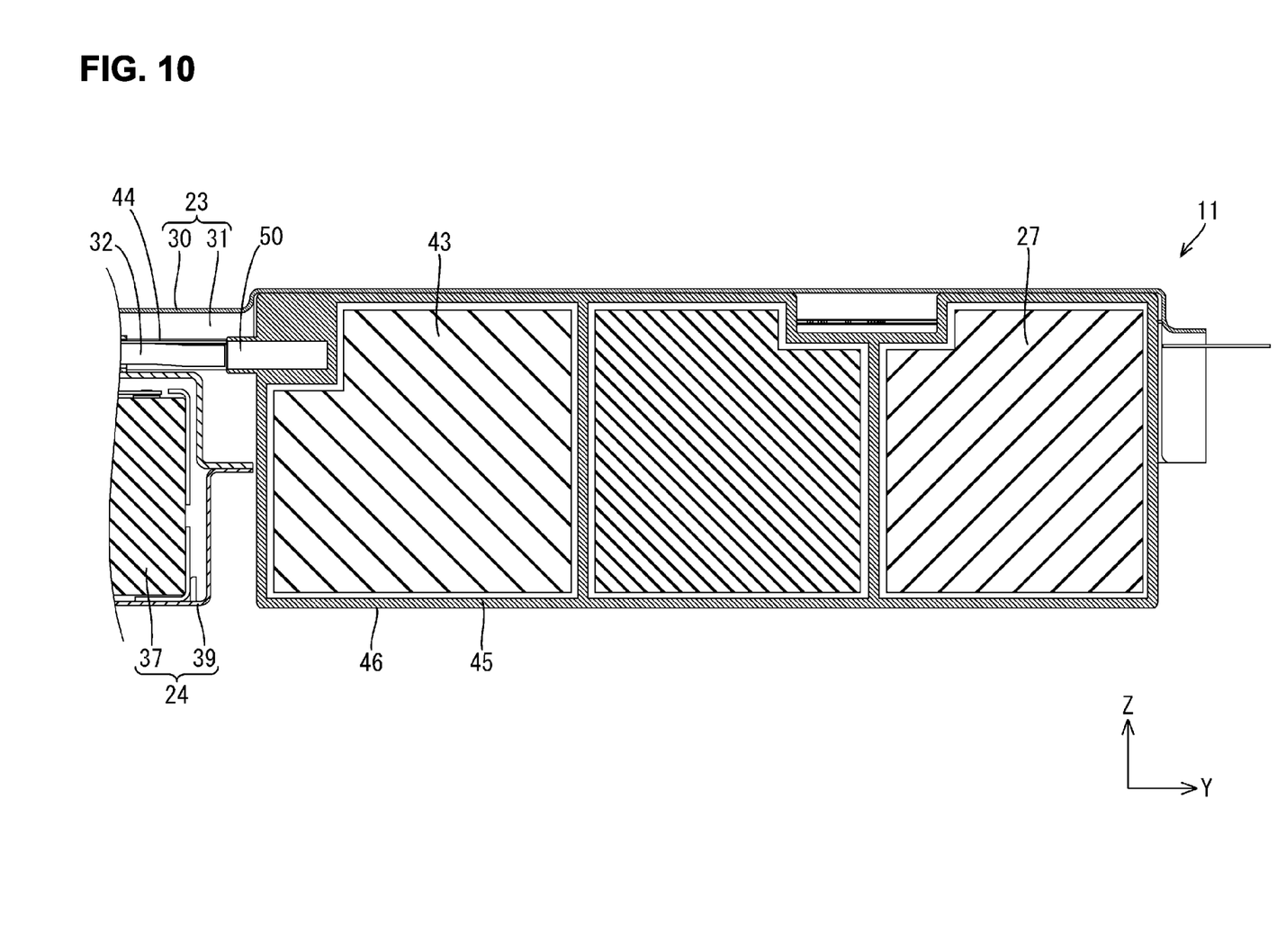
FIG. 10 is a cross-sectional view taken long the line X-X in FIG. 3.

As shown in FIGS. 8 and 9, an upwardly open high-voltage connector 40 is disposed at a position that is located in the vicinity of the central position of the high-voltage electricity storage device 24 in the front-rear direction, and in the vicinity of the central position thereof in the left-right direction. The high-voltage connector 40 is configured to be fitted to a standby connector 41 provided at the corresponding position of the wiring structural body 23. The high-voltage electricity storage device 24 and the wiring structural body 23 are configured to be electrically connected to each other by fitting the high-voltage connector 40 and the standby connector 41 to each other.

Figure 6:
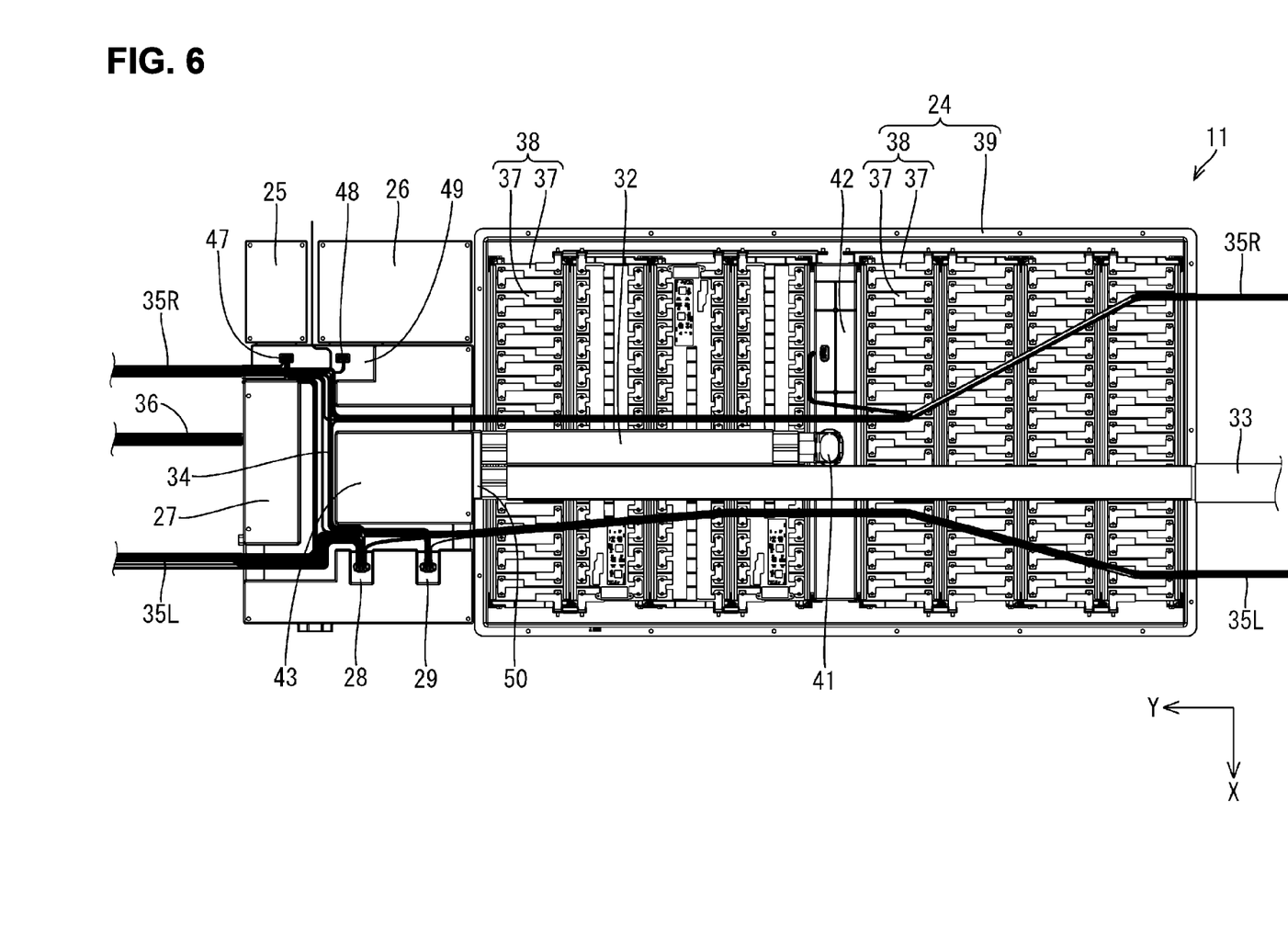
FIG. 6 is a plan view showing the power supply apparatus with a wiring structural body removed therefrom.
Figure 7:
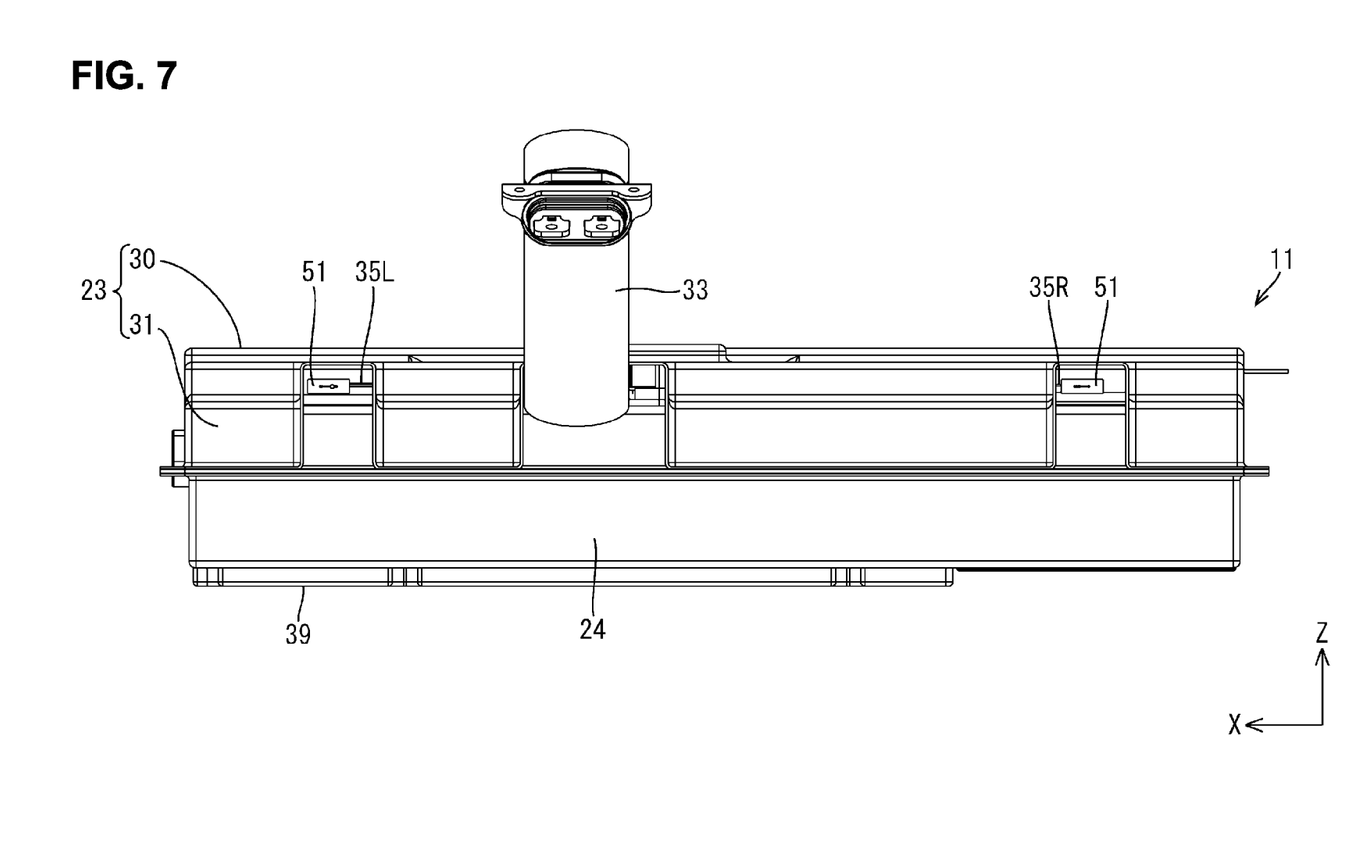
FIG. 7 is a rear view showing the power supply apparatus.

As shown in FIG. 6, a high-voltage switching box 42 that performs energization or de-energization of the high-voltage electricity storage device 24 in accordance with a signal from a control device (not shown) is disposed at a position rightward of the standby connector 41. The high-voltage switching box 42 has a rectangular shape that is elongated in the left-right direction, as viewed from above. The width of the high-voltage switching box 42 in the left-right direction is set to be approximately one half of the width of the high-voltage electricity storage device 24 in the left-right direction.

As shown in FIG. 6, the first high-voltage wire harness 32 extending forward past the high-voltage connector 40 is connected to the high-voltage connector 40. A front end portion of the first high-voltage wire harness 32 is drawn forward from a front portion of the high-voltage electricity storage device 24, and is connected to a junction box 43, which will be described below.

On the left side of the first high-voltage wire harness 32, the second high-voltage wire harness 33 is routed so as to extend lined up with the first high-voltage wire harness 32 in the front-rear direction.

As shown in FIG. 8, the cross-sectional shape of second high-voltage wires 60 constituting the second high-voltage wire harness 33 is an elliptic shape that is flat in the up-down direction, or an oblong shape. Although not shown, the cross-sectional shape of first high-voltage wires constituting the first high-voltage wire harness 32 is also an elliptic shape that is flat in the up-down direction, or an oblong shape. The first high-voltage wire harness 32 and the second high-voltage wire harness 33 are each made of a conductive metal, and are each enclosed, as a bundle, by a shield member 44 having the shape of a rectangular tube.

Multi-Function Box 45

A multi-function box 45 is disposed in a region that is located below the wiring structural body 23 and forward of the high-voltage electricity storage device 24. The multi-function box 45 includes a casing 46 made of metal. Accommodated inside the casing 46 of the multi-function box 45 are a junction box 43 that is connected to the first high-voltage wire harness 32 described above, the first low-voltage electricity storage device 25 (an example of the low-voltage electricity storage device) having an output voltage of 12 V, the second low-voltage electricity storage device 26 (an example of the low-voltage electricity storage device) having an output voltage of 48 V, the first DC/DC converter 28 that is connected to first low-voltage electricity storage device 25, and the second DC/DC converter 29 that is connected to the second low-voltage electricity storage device 26, the 100-V charger 27 that is connected to the power-feeding wire harness 36 described above, and a connector box 49 in which a 12-V connector 47 and a 100-V connector 48 are provided.

The junction box 43 is disposed at a position that is located toward a rear portion of the multi-function box 45 and in the vicinity of the center thereof in the left-right direction. The junction box 43 branches the power received from the first high-voltage wire harness 32, and transmits the power to a plurality of devices. The second high-voltage wire harness 33 extending rearward is drawn from the rear of the junction box 43 so as to be lined up with the first high-voltage wire harness 32 on the left side thereof. The second high-voltage wire harness 33 is routed in the wiring structural body 23, and is drawn rearward from the rear of the wiring structural body 23. The second high-voltage wire harness 33 is connected to the rear motor 22 via an inverter or the like (not shown), and supplies power to the rear motor 22. The first high-voltage wire harness 32 and the second high-voltage wire harness 33 are electrically connected to the junction box 43 via a power connector 50 (see FIG. 10).

A plurality of low-voltage wire harnesses 34 are connected to the junction box 43. The low-voltage wire harnesses 34 connected to the junction box 43 are branched, and are respectively connected to the devices accommodated in the multi-function box 45.

Figure 11:
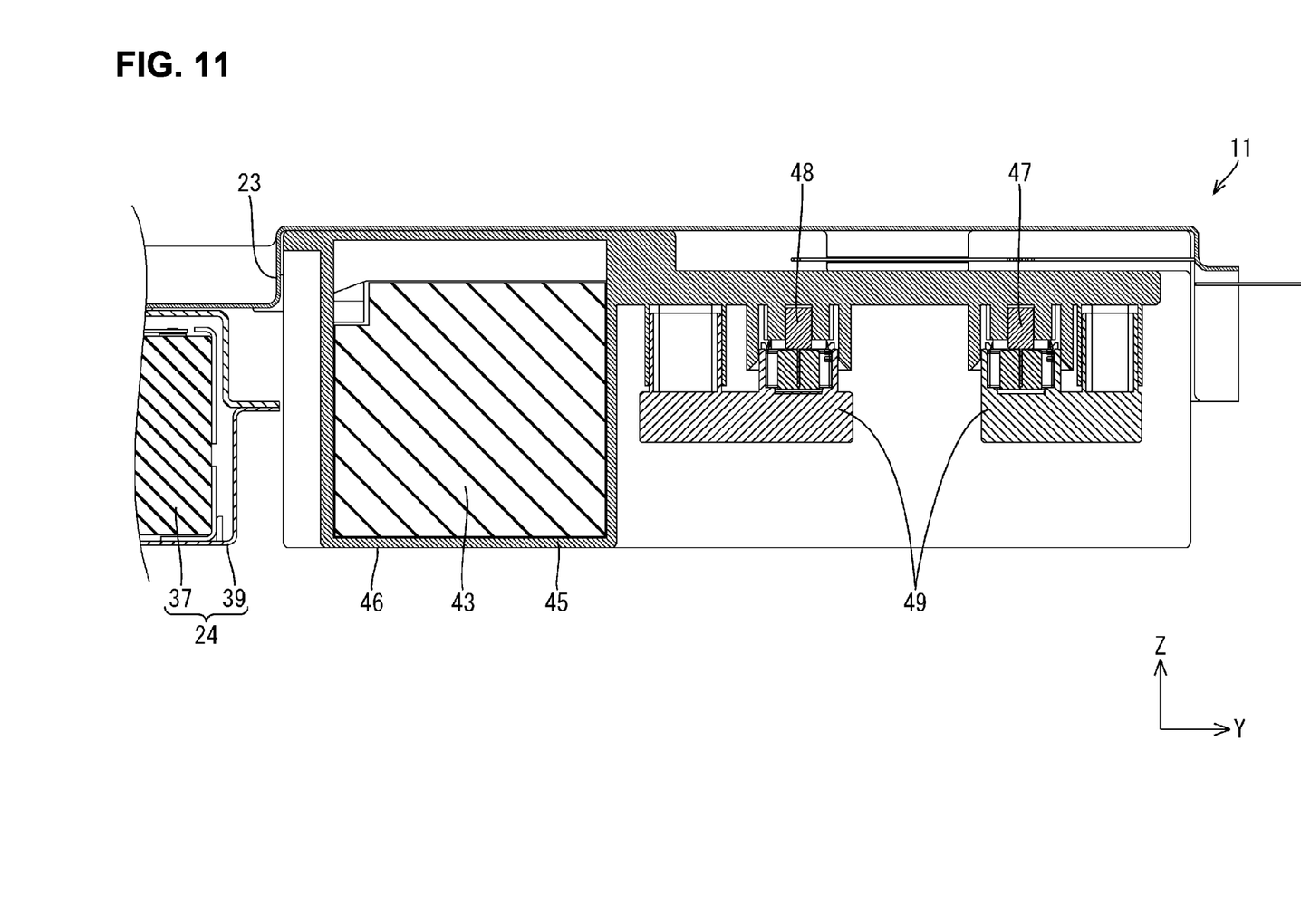
FIG. 11 is a cross-sectional view taken along the line XI-XI in FIG. 3.

The first low-voltage electricity storage device 25, the first DC/DC converter 28, and the 12-V connector 47 of the connector box 49 are connected to each other via the junction box 43 and the low-voltage wire harness 34 (see FIG. 11). Furthermore, the first low-voltage electricity storage device 25 and the high-voltage electricity storage device 24 are connected to each other via the low-voltage wire harness 34, the junction box 43, and the first high-voltage wire harness 32.

The second low-voltage electricity storage device 26 and the second DC/DC converter 29 are connected to each other via the junction box 43 and the low-voltage wire harness 34. Furthermore, the second low-voltage electricity storage device 26 and the high-voltage electricity storage device 24 are connected to each other via the low-voltage wire harness 34, the junction box 43, and the first high-voltage wire harness 32.

The 100-V charger 27 and the 100-V connector 48 of the connector box 49 are connected to each other via the junction box 43 and the low-voltage wire harness 34 (see FIG. 11). The 100-V charger 27 is connected to the high-voltage electricity storage device 24 via the low-voltage wire harness 34, the junction box 43, and the first high-voltage wire harness 32.

Note that FIG. 6 only depicts the main low-voltage wire harness 34, and the illustrations of the other low-voltage wire harnesses 34 have been omitted.

As shown in FIG. 6, the first low-voltage electricity storage device 25 is disposed at the front right of the multi-function box 45. The first low-voltage electricity storage device 25 has a rectangular shape as viewed from above. The second low-voltage electricity storage device 26 is disposed rearward of the first low-voltage electricity storage device 25. The second low-voltage electricity storage device 26 has a rectangular shape that is slightly larger than the first low-voltage electricity storage device 25 as viewed from above. Note that the arrangement of the first low-voltage electricity storage device 25 and the second low-voltage electricity storage device 26 in the front-rear direction is not limited to the arrangement shown in the present embodiment.

The connector box 49 is disposed on the left side of the first low-voltage electricity storage device 25 and the second low-voltage electricity storage device 26 that are disposed so as to be aligned in the front-rear direction. The connector box 49 has a rectangular shape that is narrow in the left-right direction as viewed from above. The 12-V connector 47 is disposed on the front side of the connector box 49, and the 100-V connector 48 is disposed on the rear side of the connector box 49. Note that the arrangement of the 12-V connector 47 and the 100-V connector 48 in the front-rear direction is not limited to the arrangement shown in the present embodiment.

The instrument panel 18 is disposed above the connector box 49. The 12-V socket 19 of the instrument panel 18 and the 12-V connector 47 are electrically connected to each other by a wire harness, which is not shown. The 100-V socket 20 of the instrument panel 18 and the 100-V connector 48 are electrically connected to each other by a wire harness, which is not shown.

At a left end portion of the multi-function box 45, the first DC/DC converter 28 that is electrically connected to the first low-voltage electricity storage device 25, and the second DC/DC converter 29 that is electrically connected to the second low-voltage electricity storage device 26 are disposed so as to be aligned in the front-rear direction. Note that the arrangement of the first DC/DC converter 28 and the second DC/DC converter 29 in the front-rear direction is not limited to the arrangement shown in the present embodiment.

Operations and Effects of the Embodiment

Next, operations and effects of the present embodiment will be described. The present embodiment is a power supply apparatus 11 that can be disposed below a floor panel 16 of a vehicle 10, including: a wiring structural body 23 that is disposed below the floor panel 16, and is routed such that a first high-voltage wire harness 32, a second high-voltage wire harness 33, and a low-voltage wire harness 34 extend along the wiring structural body 23; a high-voltage electricity storage device 24 that is disposed below the wiring structural body 23, and is connected to the first high-voltage wire harness 32, the second high-voltage wire harness 33, and the low-voltage wire harness 34; a first low-voltage electricity storage device 25 and a second low-voltage electricity storage device 26 that are disposed below the wiring structural body 23, are connected to the first high-voltage wire harness 32, the second high-voltage wire harness 33, and the low-voltage wire harness 34, and output a voltage smaller than a voltage output by the high-voltage electricity storage device 24; and a 100-V charger 27, a first DC/DC converter 28, and a second DC/DC converter 29 that are disposed below the wiring structural body 23, and are connected to at least one of the high-voltage electricity storage device 24, the first low-voltage electricity storage device 25, and the second low-voltage electricity storage device 26 via the first high-voltage wire harness 32, the second high-voltage wire harness 33, and the low-voltage wire harness 34.

With the above-described configuration, the high-voltage electricity storage device 24, the first and second low-voltage electricity storage devices 25 and 26, as well as the 100-V charger 27, the first DC/DC converter 28, and the second DC/DC converter 29 can be collectively disposed below the floor panel 16 of the vehicle 10 in a compact manner. Accordingly, it is possible to reduce the length of the wire harness for connecting the high-voltage electricity storage device 24, as well as at least one of the first and second low-voltage electricity storage devices 25 and 26, and at least one of the 100-V charger 27, the first DC/DC converter 28, and the second DC/DC converter 29, and route the first high-voltage wire harness 32, the second high-voltage wire harness 33, and the low-voltage wire harness 34 so as to extend along the wiring structural body 23, thus making the overall wiring structure of the power supply apparatus 11 compact.

Since the power supply apparatus 11 according to the present embodiment includes the first DC/DC converter 28 and the second DC/DC converter 29, the voltage of at least one of the high-voltage electricity storage device 24, and the first and second low-voltage electricity storage devices 25 and 26 can be stably output.

The high-voltage electricity storage device 24 according to the present embodiment is connected to the wiring structural body 23 via a high-voltage connector 40 and a standby connector 41.

With the above-described configuration, the high-voltage electricity storage device 24 can be removably disposed on the wiring structural body 23 via the high-voltage connector 40 and the standby connector 41. Accordingly, it is possible to easily replace the high-voltage electricity storage device 24.

The first low-voltage electricity storage device 25 according to the present embodiment is disposed forward of the wiring structural body 23.

With the above-described configuration, the first low-voltage electricity storage device 25 can be disposed forward of the floor panel 16 of the vehicle 10. Since the instrument panel 18 is disposed forward of the floor panel 16, it is possible to reduce the length of the low-voltage wire harness 34 for connecting the first low-voltage electricity storage device 25 and the instrument panel 18 to each other when DC power with a voltage of 12 V output from the first low-voltage electricity storage device 25 is to be supplied to the instrument panel 18.

According to the present embodiment, a right auxiliary wire harness 35R and a left auxiliary wire harness 35L are routed along the wiring structural body 23, and are drawn forward and rearward of the wiring structural body 23.

With the above-described configuration, the right auxiliary wire harness 35R and the left auxiliary wire harness 35L can be routed so as to extend along the wiring structural body 23, and the right auxiliary wire harness 35R and the left auxiliary wire harness 35L can be routed from the front to the rear of the vehicle 10 by being drawn rearward and forward of the wiring structural body 23. Accordingly, there is no need to separately provide a structure for routing the right auxiliary wire harness 35R and the left auxiliary wire harness 35L, and therefore the overall routing structure for the right auxiliary wire harness 35R and the left auxiliary wire harness 35L can be made compact.

The wiring structural body 23 according to the present embodiment is made of a conductive metal, and the first high-voltage wire harness 32, the second high-voltage wire harness 33, and the low-voltage wire harness 34 are routed below the wiring structural body 23.

With the above-described configuration, it is possible to keep a foreign object from colliding, from above, with the first high-voltage wire harness 32, the second high-voltage wire harness 33, and the low-voltage wire harness 34. Furthermore, it is possible to electromagnetically shield the first high-voltage wire harness 32, the second high-voltage wire harness 33, and the low-voltage wire harness 34.

An automobile according to the present embodiment is a vehicle 10 including: the power supply apparatus 11; and a vehicle body 13 including a floor panel 16 located above the power supply apparatus 11, wherein the power supply apparatus 11 is disposed in the vicinity of an intermediate position of the vehicle 10 in a front-rear direction thereof.

The above-described configuration can be easily applied to any of the cases where the vehicle 10 includes only a front motor 21, where the vehicle 10 includes only a rear motor 22, and where the vehicle 10 includes both the front motor 21 and the rear motor 22.

Other Embodiments

The technique disclosed in the present specification is not limited to the embodiment described and illustrated above. For example, the following embodiments also fall within the technical scope of the technique disclosed in the present specification.

(1) The output voltage of the low-voltage electricity storage device is not limited to 12 V or 48 V, and may be any voltage.

(2) The electric device disposed in the wiring structural body 23 is not limited to a DC/DC converter, and any electric device can be disposed in the wiring structural body 23.

(3) The low-voltage electricity storage device can be disposed at any position of the wiring structural body 23.

(4) The auxiliary wire harness 35 may be omitted.

(5) The vehicle 10 includes an electric automobile, a hybrid automobile, and a plug-in hybrid automobile.

(6) It is possible to adopt a configuration in which the first high-voltage wire harness 32, the second high-voltage wire harness 33, and the low-voltage wire harness 34 are disposed above the wiring structural body 23 so as to extend along an upper surface of the wiring structural body 23.

LIST OF REFERENCE NUMERALS

10 Vehicle
11 Power supply device
16 Floor panel
23 Wiring structural body
24 High-voltage electricity storage device
25 First low-voltage electricity storage device (example of low-voltage electricity storage device)
26 Second low-voltage electricity storage device (example of low-voltage electricity storage device)
27 100-V charger (example of electric device)
28 First DC/DC converter (example of electric device)
29 Second DC/DC converter (example of electric device)
32 First high-voltage wire harness (example of wire harness)
33 Second high-voltage wire harness (example of wire harness)
34 Low-voltage wire harness (example of wire harness)
35 Auxiliary wire harness
41 Standby connector (example of connector)
40 High-voltage connector (example of connector)

The invention claimed is:

1. A power supply apparatus that can be disposed below a floor panel of a vehicle, comprising:
a wiring structural body that is disposed below the floor panel, and is routed such that a plurality of wire harnesses extend along the wiring structural body;
at least one high-voltage electricity storage device that is disposed below the wiring structural body, and is connected to the plurality of wire harnesses;
at least one low-voltage electricity storage device that is disposed below the wiring structural body, is connected to the plurality of wire harnesses, and outputs a voltage smaller than a voltage output by the high-voltage electricity storage device; and
an electric device that is disposed below the wiring structural body, and is connected to at least one of the high-voltage electricity storage device and the low-voltage electricity storage device via the plurality of wire harnesses.

2. The power supply apparatus according to claim 1, wherein the electric device is a DC/DC converter.

3. The power supply apparatus according to claim 1, wherein at least one of the high-voltage electricity storage device and the low-voltage electricity storage device is connected to the wiring structural body via a connector.

4. The power supply apparatus according to claim 1, wherein the low-voltage electricity storage device is disposed forward of the wiring structural body.

5. The power supply apparatus according to claim 1, wherein at least one auxiliary wire harness different from the plurality of wire harnesses is routed along the wiring structural body, and is drawn forward and rearward of the wiring structural body.

6. The power supply apparatus according to claim 1, wherein the wiring structural body is made of a conductive metal, and
the plurality of wire harnesses are routed below the wiring structural body.

7. A vehicle comprising:
the power supply apparatus according to claim 1; and
a vehicle body including a floor panel located above the power supply apparatus,
wherein the power supply apparatus is disposed in the vicinity of an intermediate position of the vehicle in a front-rear direction thereof.

\* \* \* \* \*